United States Patent
Trappe et al.

(10) Patent No.: US 11,198,420 B2
(45) Date of Patent: Dec. 14, 2021

(54) SYSTEM AND METHOD FOR OPERATING A MOTOR VEHICLE WITH AN ELECTRIC PARKING BRAKE

(71) Applicant: Ford Global Technologies, LLC, Dearborn, MI (US)

(72) Inventors: Jill Trappe, Nordrhein Westfalen (DE); Sebastian Leitermann, Erfstadt (DE); Marc Suermann, Duisburg (DE)

(73) Assignee: Ford Global Technologies, LLC, Dearborn, MI (US)

(*) Notice: Subject to any disclaimer, the term of this patent is extended or adjusted under 35 U.S.C. 154(b) by 508 days.

(21) Appl. No.: 15/630,722

(22) Filed: Jun. 22, 2017

(65) Prior Publication Data

US 2017/0369046 A1 Dec. 28, 2017

(30) Foreign Application Priority Data

Jun. 23, 2016 (DE) .......................... 102016211241.4

(51) Int. Cl.
| | |
|---|---|
| *B60T 13/66* | (2006.01) |
| *B60T 13/74* | (2006.01) |
| *B60T 7/12* | (2006.01) |
| *B60T 8/171* | (2006.01) |
| *F16H 63/48* | (2006.01) |
| *B60T 7/08* | (2006.01) |

(52) U.S. Cl.
CPC .............. *B60T 13/662* (2013.01); *B60T 7/12* (2013.01); *B60T 7/122* (2013.01); *B60T 8/171* (2013.01); *B60T 13/74* (2013.01); *B60T 13/741* (2013.01); *F16H 63/483* (2013.01); *B60T 7/085* (2013.01); *B60T 2201/06* (2013.01); *B60T 2270/89* (2013.01)

(58) Field of Classification Search
CPC ......... F16H 63/483; F16D 2500/30806; F16D 2500/30808; F16D 2500/31466; F16D 2500/30401; F16D 2500/31413; F16D 2500/50224; F16D 2500/50841; F16D 2500/50883; F16D 2500/5126
See application file for complete search history.

(56) References Cited

U.S. PATENT DOCUMENTS

| | | | | |
|---|---|---|---|---|
| 4,658,942 A | * | 4/1987 | Kubota .................. | B60T 7/122 137/598 |
| 4,817,471 A | * | 4/1989 | Tury ...................... | F16H 59/12 477/121 |

(Continued)

FOREIGN PATENT DOCUMENTS

GB        2376990 A    * 12/2002   .............. B60T 7/107

*Primary Examiner* — David R Morris
(74) *Attorney, Agent, or Firm* — Raymond L. Coppiellie; Burgess Law Office, PLLC

(57) ABSTRACT

A system and method for operating a motor vehicle with an electric parking brake. The system includes a clutch sensor, generating a clutch sensor signal representing operation of a clutch of the motor vehicle. A gear selection sensor generates a sensor signal indicating a particular gear selection or position of a manual gearbox of the motor vehicle. Using these and if needed other various inputs, the system generates a deactivation signal for releasing the electric parking brake when a clutch operation is detected and the vehicle gearbox is positioned or has a gear selection other than a neutral position of the manual gearbox.

8 Claims, 1 Drawing Sheet

(56) References Cited

U.S. PATENT DOCUMENTS

| | | | | |
|---|---|---|---|---|
| 7,407,463 | B2* | 8/2008 | Kinder | B60T 7/107 |
| | | | | 477/170 |
| 8,442,734 | B2* | 5/2013 | Desfriches | F16D 48/06 |
| | | | | 701/67 |
| 8,532,895 | B2* | 9/2013 | Desfriches | B60W 40/12 |
| | | | | 192/54.1 |
| 8,589,044 | B2* | 11/2013 | Desfriches | F16D 48/06 |
| | | | | 701/1 |
| 9,028,015 | B2* | 5/2015 | Klusemann | B60T 7/12 |
| | | | | 192/13 A |
| 9,358,982 | B2* | 6/2016 | Desfriches | B60W 30/18118 |
| 2006/0076204 | A1* | 4/2006 | Kinder | B60T 7/107 |
| | | | | 192/15 |
| 2008/0190718 | A1* | 8/2008 | Klusemann | B60T 7/12 |
| | | | | 188/161 |
| 2010/0179738 | A1* | 7/2010 | Desfriches | B60W 30/18118 |
| | | | | 701/68 |
| 2010/0179739 | A1* | 7/2010 | Desfriches | F16D 48/06 |
| | | | | 701/68 |
| 2010/0185355 | A1* | 7/2010 | Desfriches | F16D 48/06 |
| | | | | 701/31.4 |
| 2010/0185374 | A1* | 7/2010 | Desfriches | F16D 48/06 |
| | | | | 701/68 |

* cited by examiner

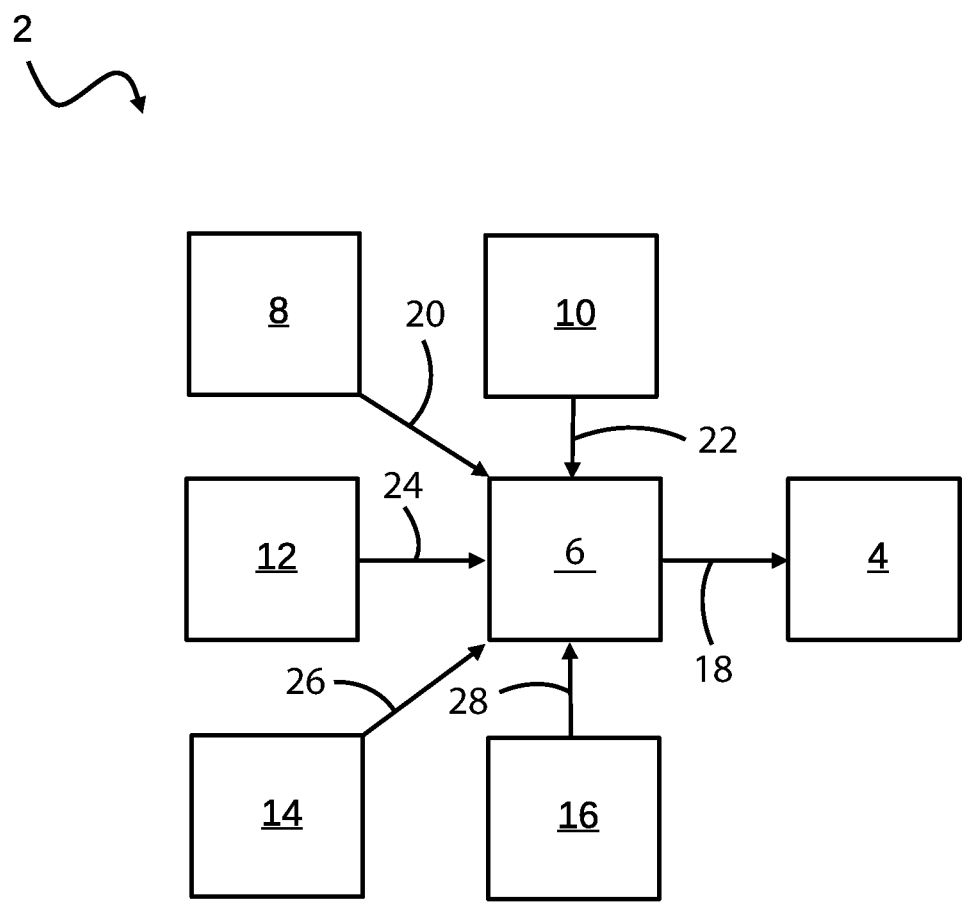

SYSTEM AND METHOD FOR OPERATING A MOTOR VEHICLE WITH AN ELECTRIC PARKING BRAKE

CROSS-REFERENCE TO RELATED APPLICATIONS

Not Applicable.

BACKGROUND OF THE INVENTION

1. Field of the Invention

The present invention relates generally to system and method for operating a motor vehicle with a parking brake; and more specifically, to a system and method for controlling an electric parking brake.

2. Description of Related Art

Electric parking brakes, known as an EPB, sometimes called an APB—automatic parking brake, are increasingly superseding the mechanical parking brake in the automotive industry. Electric parking brakes are also called electric holding brakes.

To operate a conventional parking brake the driver of the motor vehicle uses their foot or hand and moves a mechanical device producing a holding force on the rear brake system typically through a cable pull. Basically, the driver of the motor vehicle uses an operating unit, either hand or foot operated, to produce an individual mechanical force. The force transferred to the rear brake system by a mechanical cable pull or pulls, wherein the force is exerted on the brake disk or drum. With electric parking brakes, the brake force is produced with actuators.

Typically, a suitable switch, actuated by the driver of the motor vehicle releases the electric parking brake. Alternatively, automatic release of the parking brake can be carried out upon detecting clutch engagement and gas pedal operation. However, many motor vehicle drivers often drive away without operating the accelerator pedal or gas pedal, especially on slightly sloping road segments with downslopes. Consequently, automatic release of the electric parking brake does not take place because of the lack of gas pedal operation.

SUMMARY OF THE INVENTION

A motor vehicle including an electric parking brake. A clutch sensor, the clutch sensor generating a signal based on operation of a clutch of the motor vehicle and a gear selection sensor, the gear selection sensor generating a signal based on a gear selection of the manual gearbox of the motor vehicle. A control unit connected to the electric parking brake, receives the gear selection signal and the clutch operation signal, the control unit sending a deactivation signal to release the electric parking brake if a clutch operation is detected and at a gear position other than a neutral position of the manual gearbox is detected as a gear selection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

The drawing is a schematic view of a system for controlling an electric parking brake for a motor vehicle according to an exemplary embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

The drawing illustrates a system, seen generally at 2, for controlling or operating an electric parking brake 4 of a motor vehicle (not shown), such as for example an automobile. The system 2 includes a control unit 6 having an output side connected to or associated with the electric parking brake 4. The control unit 6 automatically releasing the electric parking brake 4, in general the control unit generates a release or deactivation signal 18 sent to the electric parking brake 4. As shown, the control unit 6 connects on an input side to a clutch sensor 8 and a gear selection sensor 10 of the motor vehicle.

The clutch sensor 8 detects clutch pedal operation of the motor vehicle. Upon detecting a clutch engagement process, for example the driver of the motor vehicle releasing the clutch pedal wherein the clutch pedal falls below a minimum degree of disengagement, the system 2 concludes an engaged clutch and generates a clutch sensor signal 20, for example a logic signal of one signifying an engaged clutch. The clutch sensor signal 20 applied to the input side of the control unit 6.

The gear selection sensor 10 detects whether the gear lever of a manual gearbox of the motor vehicle is in the neutral position. For example, if the gear lever is in the neutral position, the system 2 generates a gear selection sensor signal 22, for example a logic signal of one signifying the gear lever in a neutral position. The gear selection sensor signal 22 applied to the input side of the control unit 6. In addition, the gear selection sensor may detect the particular selected gear of the manual gearbox and engaged by the driver of the motor vehicle. In this case, the gear selection sensor transmits a data set to the control unit 6 containing information relating to the engaged gear.

In the present exemplary embodiment, the control unit 6 is connected on the input side to a seat belt monitor 12, an operation sensor 14, and a driver's door monitor 16. The seat belt monitor 12 producing a seat belt signal 24, for example a logic signal of one signifying that all persons on seats have fastened their seatbelts. The operation sensor 14 produces an operating signal 26, for example a logic signal one signifying that the engine of the motor vehicle 2 is operating and is not in the case of an internal combustion engine at rest. The driver's door monitor 16 produces a driver's door signal 28, for example a logic signal one signifying that the driver's door of the motor vehicle is closed.

The control unit 6 produces a deactivation signal 18 for releasing the electric parking brake 4 and transmits the deactivation signal 18 to the electric parking brake 4 to trigger release of the electric parking brake 4 if the clutch sensor signal 20, the gear selection sensor signal 22, the seat belt signal 24, the operating signal 26 and the driver's door signal 28 are all at a logic signal one.

During operation, if the motor vehicle is stationary on a level road segment, typically determined by a vehicle inclination sensor, not shown, and the electric parking brake 4 is activated and the seat belt signal 24, the operating signal 26 and the driver's door signal 28 are all at a logic signal one and the clutch sensor signal 20 and the gear selection sensor signal 22 are both at a logic signal one, the deactivation signal 18 for releasing the electric parking brake 4 is produced and sent to the electric parking brake 4.

If the motor vehicle is stationary on a road segment having a downslope in the forward direction of the motor vehicle and the electric parking brake 4 is activated and the seat belt signal 24, the operating signal 26 and the driver's door signal 28 and the clutch sensor signal 20 are all at a logic signal one and the gear selection sensor signal 22 generates a signal indicating gear engagement other than the neutral position or the reverse gear of the manual gearbox, the deactivation signal 18 for releasing the electric parking brake 4 is produced and sent to the electric parking brake 4.

If the motor vehicle is stationary on a road segment having a downslope in the reverse direction of the motor vehicle and the electric parking brake 4 is activated and the seat belt signal 24, the operating signal 26 and the driver's door signal 28 and the clutch sensor signal 20 are all at a logic signal one and the gear selection sensor signal 22 generates a signal indicating the reverse gear of the manual gearbox is engaged, and the wheel propulsion torque is at least sufficient to prevent the vehicle from rolling against the driver intended direction, the deactivation signal 18 for releasing the electric parking brake 4 is produced and sent to the electric parking brake 4.

If the motor vehicle is stationary on a road segment having an upslope in the forward direction of the motor vehicle and the electric parking brake 4 is activated and the seat belt signal 24, the operating signal 26 and the driver's door signal 28 and the clutch sensor signal 20 are all a logic signal one and the gear selection sensor signal 22 indicates that neither the neutral position nor the reverse gear of the manual gearbox have been engaged, and at the same time, a wheel propulsion torque is provided that is large enough to prevent rolling of the motor vehicle in the opposite direction to the desired driving direction, the deactivation signal 18 for releasing the electric parking brake 4 is produced and sent to the electric parking brake 4.

If the motor vehicle is stationary on a road segment having an upslope in the forward direction of the motor vehicle and the electric parking brake 4 is activated and the seat belt signal 24, the operating signal 26 and the driver's door signal 28 and the clutch sensor signal 20 are all at a logic signal one and the gear selection sensor signal 22 indicates that the reverse gear of the manual gearbox has been engaged, and at the same time, a wheel propulsion torque is provided that is large enough to prevent the motor vehicle rolling opposite to the desired driving direction, the deactivation signal 18 for releasing the electric parking brake 4 is produced and sent to the electric parking brake 4.

If the motor vehicle is stationary on a level road segment or on a road segment having an upslope or downslopes in the forward direction of the motor vehicle and the electric parking brake 4 is activated and the seat belt signal 24, the operating signal 26 and the clutch sensor signal 20 are all at a logic signal one and the gear selection sensor signal 22 indicates that the neutral position has not been selected, the driver of the motor vehicle is informed, for example with a text message, that automatic release of the electric parking brake 4 is not possible, but a manual release of the electric parking brake 4 is necessary by operating a corresponding switch by the driver of the motor vehicle.

The system 2 produces a deactivation signal 18 for releasing the electric parking brake 4 and makes possible starting off or moving the vehicle without operating the gas pedal.

The system 2 detects whether the manual gearbox is no longer in the neutral position or is idling rather than gas pedal operation by the driver of the motor vehicle. A driver's intention to drive the motor vehicle is deduced by using gear selection, moving the gear lever from the neutral position thereof. Thus, a deactivation signal for automatically releasing the electric parking brake can be produced and driving away without operating the gas pedal is possible.

The system 2 detects and analyzes the gear position specifically whether the manual gearbox is in a neutral position. The gear selection sensor 10 detects whether the gear lever is in the neutral position or the manual gearbox is idling. If the gear lever is not in the neutral position or the manual gearbox is not idling, the system 2 concludes that a gear has been selected by the driver of the motor vehicle, for example the first gear or the reverse gear, to initiate a startup procedure.

Detecting and analyzing the selected gear position includes detecting, besides the neutral position or idling, using the gear selection sensor 10 which gear is engaged by the driver of the motor vehicle, for example whether it is the first, second, third gear and so on. The system 2 inhibits release of the electric parking brake 4 if an unsuitable gear has been selected for a startup procedure by the driver of the motor vehicle, such as for example the fifth gear.

Detecting and analyzing a seat belt signal 24 of a seat belt monitor 12 of the motor vehicle and/or an operating signal 26 of the engine of the motor vehicle and/or a driver's door signal 28 of a driver's door monitor 16 provides additional input variables used to enhance the reliability of the method. The seat belt monitor 12 detects whether persons on the seats of the motor vehicle, at least the driver of the motor vehicle, have fastened their seatbelts. The operation or operating signal 26 indicates that the engine, for example an internal combustion engine of the motor vehicle, is running, whereas the driver's door signal 28 indicates that the driver's door is closed. These input variables can additionally indicate, by the presence thereof, a driver's intention to drive the motor vehicle.

The system also includes a motor vehicle, an electric parking brake and a control unit for such an electric parking brake, each designed to carry out such a method.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for operating a motor vehicle with an electric parking brake comprising the steps of:
    detecting a clutch operation of a clutch of the motor vehicle;
    detecting a gear selection of a manual gearbox of the motor vehicle;
    detecting seat occupancy based on a seat belt signal;
    detecting a vehicle inclination; and
    generating a deactivation signal for releasing the electric parking brake when the clutch operation is detected, other than a neutral position of the manual gearbox is detected as the gear selection, seat occupancy is detected; and the vehicle is level, wherein the selected gear of the manual gearbox is detected and analyzed.

2. A motor vehicle comprising:
an electric parking brake;
a clutch sensor, said clutch sensor generating a signal based on operation of a clutch of the motor vehicle;
a gear selection sensor, said gear selection sensor generating a signal indicative of a particular gear selected from a plurality of gears in a manual gearbox of the motor vehicle; and
a control unit connected to the electric parking brake, said control unit sending a deactivation signal to release the electric parking brake if a clutch operation is detected and at least a first gear or a reverse gear is selected as the particular gear from the plurality of gears in the manual gearbox.

3. The motor vehicle of claim 2 wherein said gear selection sensor detects the neutral position of the manual gearbox.

4. The motor vehicle of claim 2 wherein said control unit receives a seat belt signal of a seat belt monitoring device of the motor vehicle and an operating signal of an engine of the motor vehicle and a driver's door signal of a driver's door monitor.

5. The motor vehicle of claim 4 wherein the control unit sends a deactivation signal to release said electric parking brake based on a predetermined seat belt signal, operating signal, and driver's door signal.

6. A motor vehicle comprising:
an electric parking brake;
a clutch sensor generating a signal based on operation of a clutch;
a gear selection sensor generating a signal based on a gear selection of a manual gearbox;
a seat belt monitoring device generating a signal based on seat occupancy;
an operation sensor generating a signal based on engine operation;
a driver's door monitor generating a signal based on door position; and
a control unit connected to the electric parking brake, said control unit sending a deactivation signal to release the electric parking brake upon receiving a predetermined signal from said clutch sensor, gear selection sensor, seat belt monitoring device, operation sensor, and driver's door monitor.

7. The motor vehicle of claim 6 wherein said signal generated by said operation sensor, driver door monitor, and control unit is a logic signal one.

8. A method for operating a motor vehicle with an electric parking brake comprising the steps of:
detecting a clutch actuation of a clutch of the motor vehicle;
detection of a particular selected gear selected from a plurality of gears of a manual gearbox of the motor vehicle, the particular selected gear of the manual gearbox being detected and evaluated;
generating a deactivation signal for releasing the electric parking brake when a clutch actuation is detected, and at least a first gear or a reverse gear of the manual gearbox is selected as the particular selected gear, and upon release of the electric parking brake moving the motor vehicle without actuating an accelerator pedal; and
suppressing the deactivation signal if the particular selected gear is other than the first gear or the reverse gear.

\* \* \* \* \*